May 12, 1970  H. C. BRAUCHLA  3,511,286
HAND STRIP SCREW DRIVING GUN
Filed Oct. 3, 1966
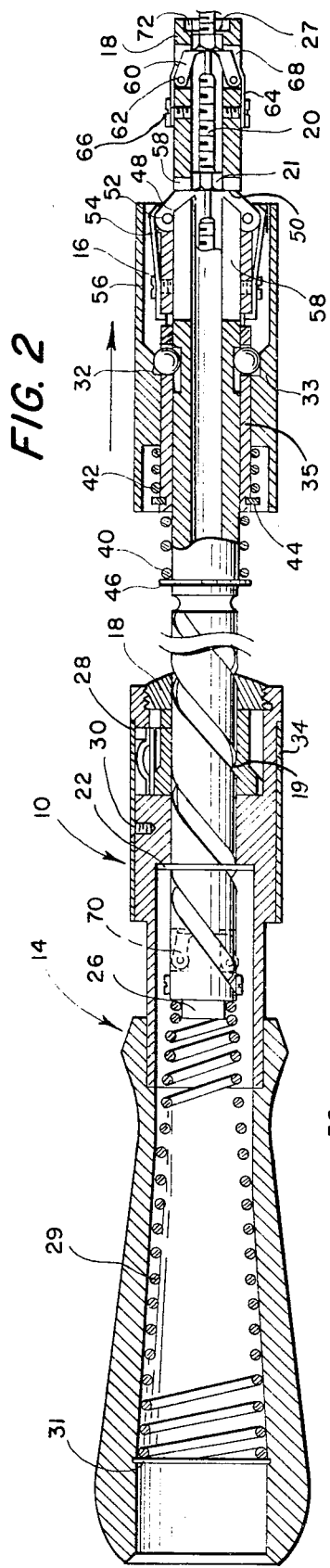
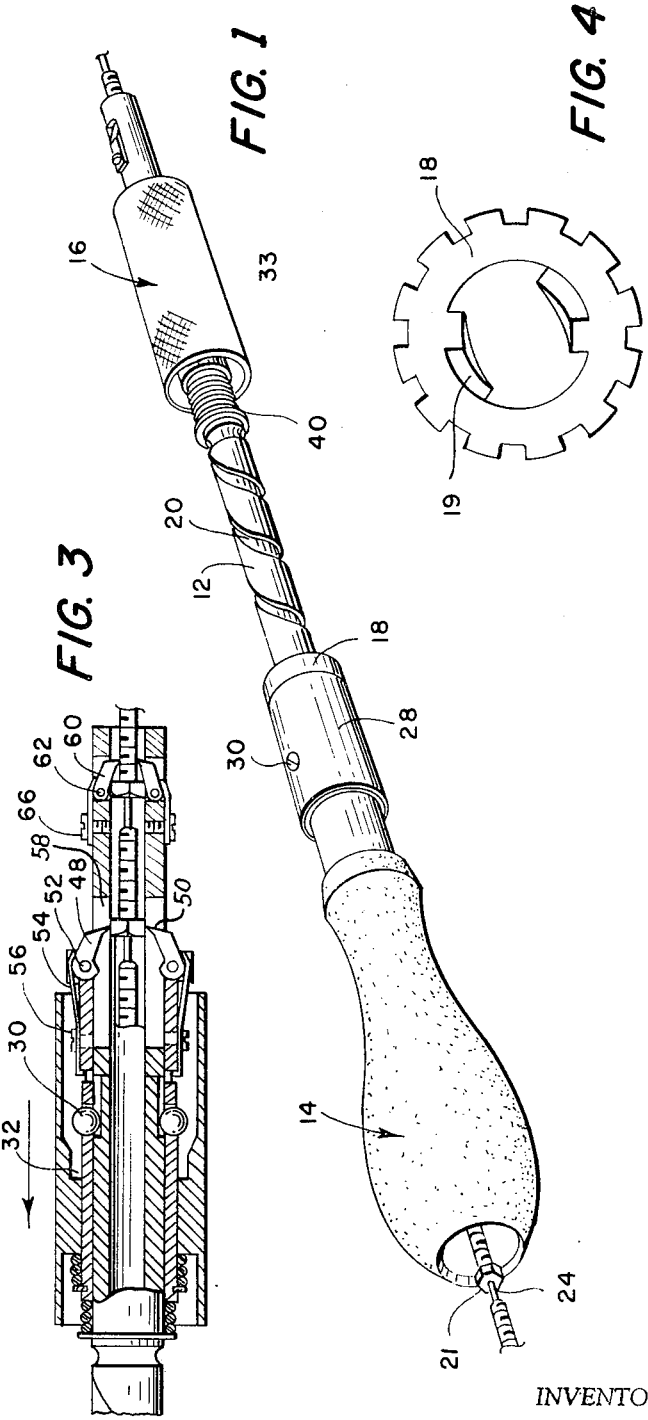
INVENTOR
HERBERT C. BRAUCHLA
BY Semmes & Semmes
ATTORNEYS United States Patent Office 3,511,286
Patented May 12, 1970

3,511,286
HAND STRIP SCREW DRIVING GUN
Herbert C. Brauchla, Fremont, Ohio, assignor of one-half to J. D. Guernsey, Fostoria, Ohio
Filed Oct. 3, 1966, Ser. No. 583,774
Int. Cl. B25b 15/06
U.S. Cl. 145—53      3 Claims

ABSTRACT OF THE DISCLOSURE

Automatic screw drivers, particularly a hand operated "gun" for driving screw strips comprised of a plurality of integrated longitudinally aligned screws.

---

The present application relates to a hand strip screw driving gun, particularly a manually driven, "yankee-type" gun used in driving a strip of integrally, axially aligned strip screws.

The "yankee hand gun" principle has been used for a considerable length of time in manually operated tools for the driving of screws or in drilling or reaming actions. Here, this principle is adapted to the driving of a strip screw. The strip screw is rotated by means of its insertion within a rotatable barrel, having a bore configured complementally with the screw head. The strip screw is advanced by a pair of radially inwardly extending jaws engaging the rear of the screw head, the jaws axially advancing towards the discharge end of the barrel so as to urge the lead screw out of the rotating barrel. When the advancing jaws are reversely longitudinally moved so as to re-engage a succeeding screw head, the entire strip screw is locked against reverse longitudinal movement by the engagement of a pair of radially inwardly extending locking jaws locking onto the threads in the individual screw shank. This principle is incorporated in the present apparatus. As a result, there is provided a unique manual tool adapted for the advancement of strip screws.

Accordingly, it is an object of invention to provide a hand gun especially devised for the driving of strip screws.

Another object of invention is to provide an improved gun for the advancement of strip screws wherein the strip screw is positively locked against reverse longitudinal movement.

Yet additional objects of invention will become apparent from the ensuing specification and attached drawings wherein:

FIG. 1 is a perspective view of the tool, showing the screw strip partially in fragment, extending both from the feeding muzzle and the screw driving or discharge end;

FIG. 2 is a longitudinal section showing the screw advancing sleeve 16 in an attitude of advancing the screw strip;

FIG. 3 is a fragmentary elevation of the screw driving end only showing the screw advancing sleeve in an attitude of reverse stripping over the screw head for re-engagement of a succeeding screw head, and FIG. 4 is an elevation of the groove-engaging guide.

In FIG. 1 hand gun 10 is shown as comprised of rotatable barrel 12 having exterior spiral groove 20, handle 14 with groove engaging guide 18 with interior "lands" 19 and strip screw advancing sleeve 16 mounted about the forward end of the rotatable barrel. Handle 14 is keyed to concentrically engage barrel rotating assembly 34. Bushing 22 is employed to support the feeding end of barrel 12 within assembly 34. A strip of axially aligned integral screws each having head 21, thread 20, and screw tip 24 is urged inwardly of handle 14 into feeding muzzle 26, then rotatably advanced through the discharge end 27 of barrel 12. A cover 28 may be secured to barrel rotating assembly 34 by means of set screw 30. A compression spring 29 may be fiitted over muzzle 26 and interposed between muzzle 26 and lock ring 31 inwardly of handle 14.

Also, compression spring 40 may be interposed between lock ring 46 and the screw advancing sleeve inner piece 35. An additional compression spring 42 may be interposed between the advancing sleeve exterior piece 33 and lock ring 44. Exterior piece 33 has interior shoulder 32 which abuts ball bearing 32 as illustrated in FIG. 2. When the advancing sleeve 16 is reversely longitudinally moved so as to compress springs 40 and 42, shoulder 32 is removed from the ball bearing 30, as illustrated in FIG. 3.

A pair of screw head engaging jaws 48 each having forward perpendicular surface 50 and being pivoted in advancing sleeve inner-piece 35 by means of pins 52 is radially inwardly urged through opposed barrel apertures 58 by means of leaf spring 54 seecured by set screw 56. As illustrated in FIG. 2, perpendicular surfaces 50 engage the rear of the screw head 22 advancing the strip screw longitudinally forward. This action continues until shoulder 32 abuts ball bearing 30 as shown in FIG. 2. When springs 40 and 42 are compressed (FIG. 3) the advancing sleeve members 33 and 35 are moved relatively reversely with respect to barrel 12, permitting jaw 48 to shear over the succeeding screw head for the re-advancing cycle. A pair of forward thread-engaging locking jaws 60 are pivoted by means of pin 62 and radially inwardly urged through opposed apertures 68 to engage the screw threads by means of leaf spring 64 secured in barrel 12 discharge end by set screw 66. This action, as illustrated in FIG. 3 prevents reverse longitudinal movement of the strip screw upon reverse stripping of jaws 48 over the individual screw head. A rear or feeding end locking jaws 70 are illustrated in phantom, in FIG. 2.

As will be apparent, the interior bore 27 of rotating barrel 12 may be variously configured to accommodate screw heads of varying configuration, for example octagonal, triangular, rectangular or the like. Also, locking ring 46 may be longitudinally adjusted so as to limit the longitudinal action of advancing sleeve 16 and accommodate the advancement of screws having shanks of various length.

Manifestly, various changes in structure of the rotating mechanism may be employed without departing from the spirit and scope of invention, and defined in the subjoined claims.

I claim:
1. A hand strip screwdriver comprising:
 (A) a rotatable barrel with interior bore adapted for axial feeding at its feeding end and discharge of integrally aligned strip screws at an increased diameter discharge end and having an exterior spiral groove so as to complementally engage a barrel rotating means;
 (B) a barrel rotating means mounted for longitudinal reciprocation about the feeding end of said barrel and including stud means engaging said exterior grooves of said barrel, so as to rotate said barrel upon axial movement of said hand driver with respect to said barrel;
 (C) a screw advancing sleeve mounted for longitudinal reciprocal movement about the discharge end of said barrel and including a pair of radially inwardly extending advancing jaws pivoted to said advancing sleeve and extending through opposed apertures in said barrel so as to abut the rear of a strip screw head; and
 (D) at least two pair of thread-engaging locking jaws extending radially inwardly of said barrel so as to engage the strip screw threads from opposite sides and prevent reverse axial movement of said threads upon reverse axial movement of said screw-advancing sleeve, said thread-engaging locking jaw including:
  (i) a first pair of thread-engaging locking jaws mounted at the feeding end of said barrel spring-urged radially inwardly thereof so as to engage the screw strip, and
  (ii) a second pair of thread-engaging locking jaws mounted at the discharge of said barrel spring urged radially inwardly thereof so as to engage the thread of the screw strip adjacent the lead screw being driven.

2. A hand strip screw driver as in claim 1, said screw advancing sleeve including:
  (i) a compression spring encircling said barrel so as to enable reverse stripping action of said advancing jaws, and
  (ii) a ball bearing limiting means seated in said barrel and engaging an inner shoulder in said sleeve.

3. A hand strip screw driver as in claim 1, including a lock ring means circling said barrel at the end of said exterior groove nearest said discharge end of said barrel.

References Cited

UNITED STATES PATENTS

| 2,506,835 | 5/1950 | Johnson | 144—32 |
| 3,258,042 | 6/1966 | Ruminsky | 144—32 |

FOREIGN PATENTS

| 648,878 | 1/1951 | Great Britain. |
| 659,607 | 10/1951 | Great Britain. |

ROBERT C. RIORDON, Primary Examiner

R. V. PARKER, Jr., Assistant Examiner

U.S. Cl. X.R.

144—32